United States Patent
Le et al.

(10) Patent No.: US 9,260,072 B2
(45) Date of Patent: Feb. 16, 2016

(54) PEDESTRIAN PROTECTION SENSING SYSTEM FOR VEHICLE HAVING METAL BUMPERS

(71) Applicant: Ford Global Technologies, LLC, Dearborn, MI (US)

(72) Inventors: Jialiang Le, Canton, MI (US); Manoharprasad K. Rao, Novi, MI (US); Yeruva Satya Reddy, Farmington, MI (US); Kowling Cheng, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/226,240

(22) Filed: Mar. 26, 2014

(65) Prior Publication Data

US 2015/0274107 A1    Oct. 1, 2015

(51) Int. Cl.
*B60R 21/34* (2011.01)
*B60R 21/0132* (2006.01)
*B60R 21/38* (2011.01)
*B60R 21/36* (2011.01)
*B60R 21/01* (2006.01)

(52) U.S. Cl.
CPC .......... *B60R 21/0132* (2013.01); *B60R 21/0133* (2014.12); *B60R 21/34* (2013.01); *B60R 21/36* (2013.01); *B60R 21/38* (2013.01); *B60R 2021/01006* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,364,158 | A * | 11/1994 | Watanabe et al. | 296/187.09 |
| 7,137,472 | B2 * | 11/2006 | Aoki | 180/274 |
| 7,236,866 | B2 * | 6/2007 | Takafuji et al. | 701/45 |
| 7,353,087 | B2 * | 4/2008 | Takafuji et al. | 701/1 |
| 7,493,983 | B2 * | 2/2009 | Kiribayashi | 180/274 |
| 7,539,569 | B2 * | 5/2009 | Baur et al. | 701/45 |
| 7,737,833 | B2 * | 6/2010 | Takafuji | 340/436 |
| 7,775,316 | B2 * | 8/2010 | Hosokawa et al. | 180/271 |

(Continued)

FOREIGN PATENT DOCUMENTS

| | | | | |
|---|---|---|---|---|
| DE | 10358110 A1 * | 7/2005 | | B60R 21/01 |
| DE | 102006027771 A1 * | 12/2007 | | |
| EP | 1710598 A1 | 10/2006 | | |

OTHER PUBLICATIONS

Denso, Denso Develops Pedestrian Collision Detection Sensor, Feb. 15, 2013, 4 pages.

(Continued)

*Primary Examiner* — Nicole Verley
(74) *Attorney, Agent, or Firm* — LeClairRyan

(57) ABSTRACT

A method and apparatus for controlling deployment of pedestrian head protection devices on a motor vehicle having a metal bumper is disclosed. The disclosed inventive concept involves strategic placement of accelerometer sensing devices and the derivation of a real time impact signal from the signals generated by the accelerometers. This real time impact signal is used along with thresholds and a time window to control deployment. The apparatus includes a metal bumper, two support brackets attaching the bumper to the vehicle and at least two accelerometers fitted to the bumper proximate the brackets. The derivation and use of a single impact signal from said first and second signal-generating accelerometers is achieved by taking the larger of two absolute values derived from the accelerometers.

9 Claims, 8 Drawing Sheets

(56) References Cited

U.S. PATENT DOCUMENTS

| | | | |
|---|---|---|---|
| 7,782,180 B2* | 8/2010 | Takafuji | 340/436 |
| 8,348,004 B2* | 1/2013 | Mack | 180/282 |
| 8,412,404 B2* | 4/2013 | Clark et al. | 701/31.4 |
| 8,428,862 B2* | 4/2013 | Mase et al. | 701/301 |
| 8,463,486 B2* | 6/2013 | Park | 701/30.8 |
| 8,973,957 B2* | 3/2015 | Corwin et al. | 293/102 |
| 2006/0220808 A1* | 10/2006 | Takahashi | 340/436 |
| 2006/0224289 A1* | 10/2006 | Kiribayashi et al. | 701/45 |
| 2007/0179693 A1* | 8/2007 | Dukart et al. | 701/45 |
| 2007/0227797 A1* | 10/2007 | Takahashi et al. | 180/274 |
| 2009/0204294 A1* | 8/2009 | Mack et al. | 701/45 |
| 2011/0043344 A1* | 2/2011 | Nichols et al. | 340/436 |
| 2015/0006037 A1* | 1/2015 | Ghannam et al. | 701/45 |

OTHER PUBLICATIONS

TLX Technologies, Pedestrian Safety Systems, 2 pages.

* cited by examiner

PEDESTRIAN PROTECTION SENSING SYSTEM FOR VEHICLE HAVING METAL BUMPERS

TECHNICAL FIELD

The disclosed inventive concept relates generally to pedestrian protection systems for automotive vehicles. More particularly, the disclosed inventive concept relates to a pedestrian protection system that includes a pedestrian-impact sensing system associated with a metal bumper and a deployable vehicle engine hood that is movable between a stowed position and a deployed position in the event of an impact with a pedestrian.

BACKGROUND OF THE INVENTION

Pedestrian-vehicle impact events are unfortunate but known occurrences. It is known that in a pedestrian collision, eighty percent of serious injuries occurred to the pedestrian's head while thirty-seven percent of moderate injuries were suffered by lower extremities. (Crandall et al., "Designing Road Vehicles for Pedestrian Protection," *BMJ* [formerly *British Medical Journal*], 324 [7346], pp. 1145-1148)

It is common for the pedestrian's body to be moved by the impacting vehicle such that the pedestrian's head impacts upon the vehicle's engine hood. In an effort to reduce or eliminate injury to the pedestrian's head in a pedestrian-vehicle impact event, automotive vehicle designers developed vehicle systems in which either the trailing edge of the vehicle engine hood is raised and, or alternatively, an airbag is deployed from beneath the trailing edge of the vehicle hood.

Both approaches to lessening the injuries to the pedestrian's head require a sensing system mounted in association with the vehicle bumper. Typically this sensing system is fitted to the bumper in an area adjacent to the energy absorber and behind the soft, polymerized fascia at the front of the vehicle. The fascia thus covers the components of the sensing system.

While the sensing system discussed above is suitable for most passenger cars or sport utility vehicles which incorporate fascias as part of their front end design, no similar arrangement is known for vehicles, typically trucks, that have metal bumpers. Without a pedestrian impact sensing system, it may not be possible to provide such vehicles with effective systems that can protect the head of the impacted pedestrian from serious injury.

Accordingly, there is a need for a practical and effective system to protect pedestrians in a pedestrian-vehicle impact event involving a vehicle having a metal bumper. As in so many areas of vehicle technology, there is always room for improvement related to the protection of pedestrians in a pedestrian-vehicle impact event.

SUMMARY OF THE INVENTION

The disclosed inventive concept provides a method and apparatus for controlling deployment of the pedestrian head protection device on a motor vehicle having a metal bumper. The method and apparatus of the disclosed inventive concept involves strategic placement of two accelerometer sensing devices and the derivation of a real time impact signal from the signals generated by the accelerometers. This real time impact signal is used along with thresholds and time window to control deployment.

The apparatus includes a metal bumper beam, a first rail support bracket attaching the beam to the vehicle frame, a second rail support bracket attaching the beam to the vehicle frame, a first accelerometer fitted to the beam proximate the first bracket, and a second accelerometer fitted to the beam proximate the second bracket.

Each rail support bracket includes an inboard side and an outboard side. The first accelerometer is fitted proximate one or the other of the outboard side or the inboard side of the first rail support bracket and the second accelerometer is fitted proximate one or the other of the outboard side or the inboard side of the second rail support bracket.

Optionally, third and fourth accelerometers are attached to the beam. If so provided, accelerometers are positioned on both the outboard side and the inboard side of the first rail support bracket and on both the outboard side and the inboard side of the second rail support bracket.

The positioning of the signal-generating accelerometers on the bumper beam is based on a compromise between desensitizing accelerometer-generated signals to impact location while permitting discrimination between variables selected from the group consisting of impact severity, objects and impact speed. The derivation and use of a single impact signal from said first and second signal-generating accelerometers is achieved by taking the larger of two absolute values derived from the accelerometers.

The above advantages and other advantages and features of the disclosed inventive concept will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
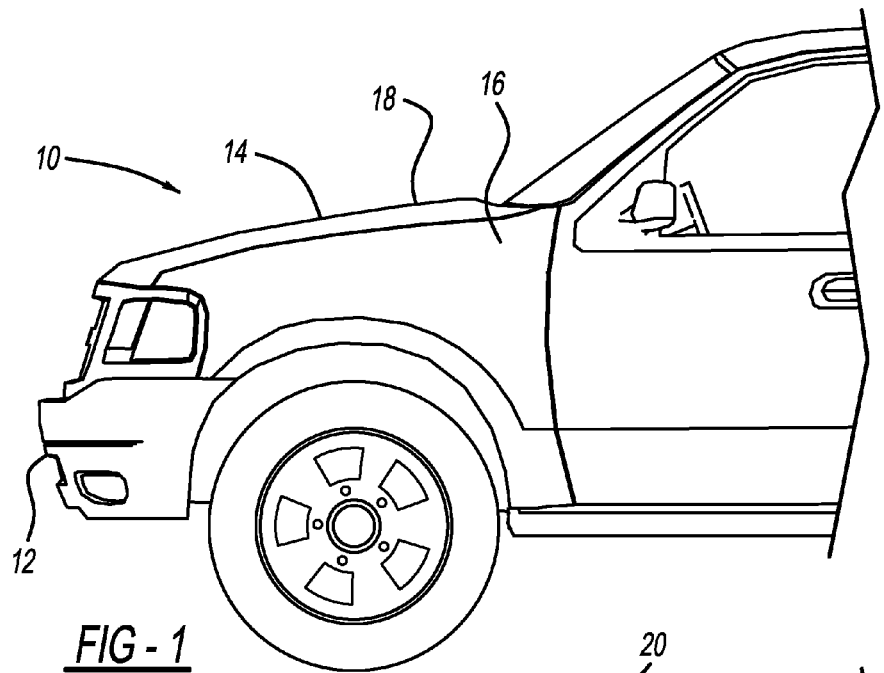
FIG. 1 is a fragmentary side view of a vehicle having a pedestrian head impact protection apparatus according to the disclosed inventive concept illustrated prior to an impact event wherein the vehicle engine hood is its closed configuration.

In the following figures, the same reference numerals will be used to refer to the same components. In the following description, various operating parameters and components are described for different constructed embodiments. These specific parameters and components are included as examples and are not meant to be limiting.

In general, the disclosed invention provides an injury mitigation system for a vehicle through the provision of a steel bumper having strategically located accelerometers that generate a signal to ultimately cause engagement of a pedestrian-protecting vehicle feature.

Referring to FIG. 1, a fragmentary side view of a motor vehicle having a pedestrian head impact protection apparatus according to the disclosed inventive concept is shown. The motor vehicle, generally illustrated as 10, is shown prior to an impact event. The motor vehicle 10 includes a metal front bumper 12 and a hinged engine hood 14. The metal front bumper 12 may be made from any of several types of metals, although steel is the most common material. The motor vehicle 10 further includes a body structure 16.

The engine hood 14 of the motor vehicle 10 is mounted on the body structure 16 of the motor vehicle 10 through one or more hinge assemblies (not shown), which are located at a rear portion 18 of the hood 14. Typically, a hood of a vehicle is mounted using two spaced-apart hinge assemblies.

In response to a sensed impact, the hood hinge assembly causes a portion of the hinge assembly (e.g., a deforming hinge member) to become deformed such that the relative position of the hood 14 with respect to the body structure 16 of the motor vehicle 10 is altered. Particularly, the relative position of the hood 14 with respect to the body structure 16 is altered in a manner whereby a distance between an underside of the hood 14 and a topmost surface of an under-hood component of the vehicle 10 is increased by such altered relative position of the hood 14 with respect to the body structure 16.

Figure 2:
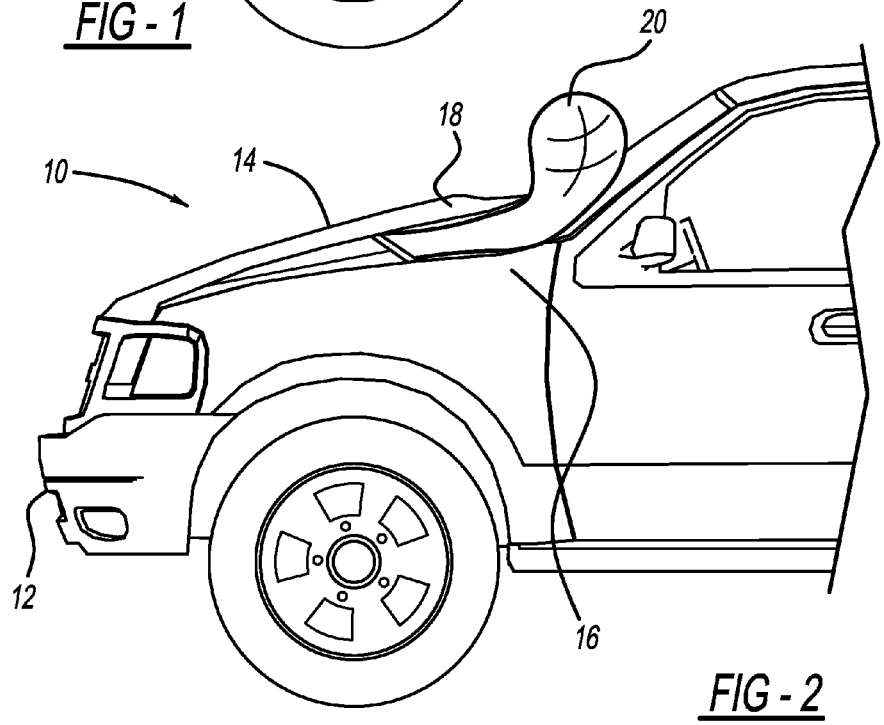
FIG. 2 is a view similar to that of FIG. 1 but illustrating the vehicle engine hood in its partially open configuration with the pedestrian-protecting airbag in its deployed state.

FIG. 2 illustrates the vehicle engine hood 14 in its partially open configuration. In such a state, the rear portion 18 of the engine hood 14 is spaced apart from the body structure 16. This state is achieved if a pedestrian impact event is sensed. Preferably, when the hood 14 is in the displaced orientation illustrated in FIG. 2, there is a gap of at least about 75 mm between the underside of the rear portion 18 of the hood 14 and the topmost surface of an under-hood component of the vehicle 10.

Optionally, an airbag 20 may be provided that simultaneously inflates with the lifting of the rear portion 18 of the vehicle engine hood 14. The airbag 20 adds further protection to the head of the impacted pedestrian (not shown). The airbag 20 is shown in FIG. 2 in its fully inflated state.

To effect movement of the vehicle engine hood 14 from its stowed position shown in FIG. 1 to its elevated position shown in FIG. 2, together with the deployment of the airbag 20, the impact of the pedestrian must first be sensed. Sensing of the impact of a pedestrian is made possible by the provision of two accelerometer sensing devices fitted to the metal bumper 12.

Figure 3:
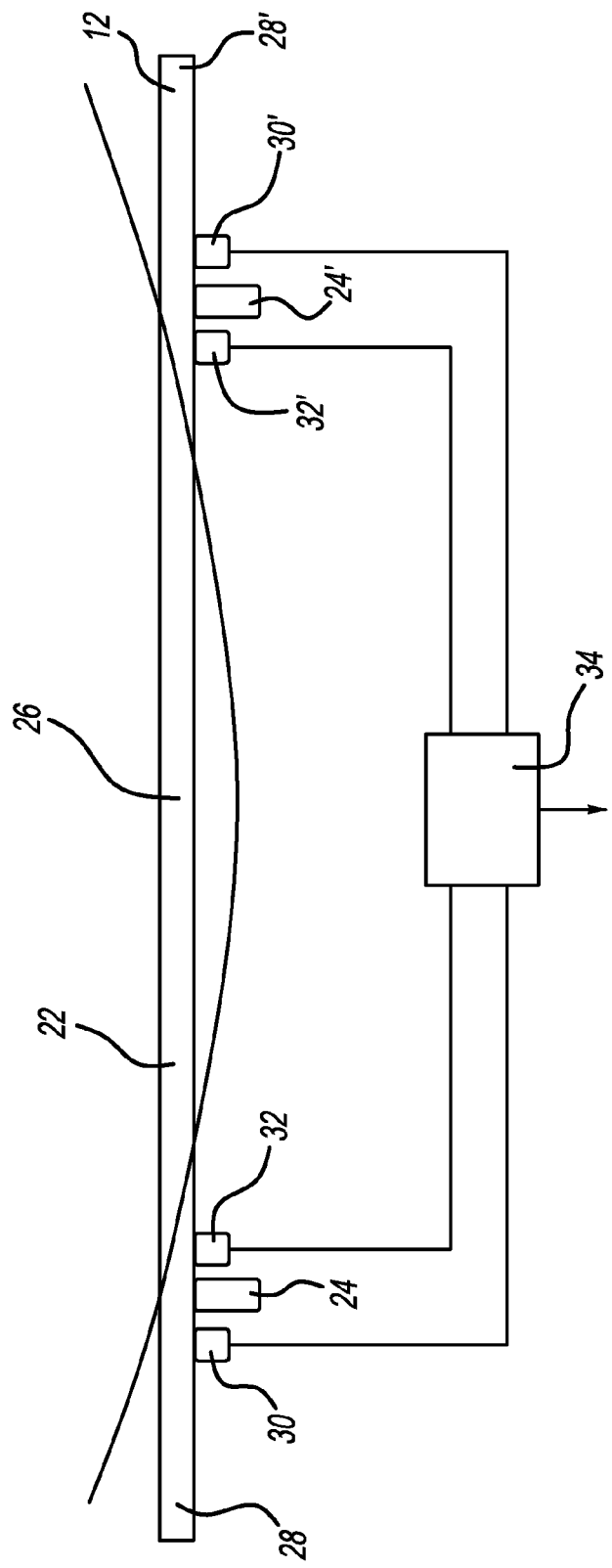
FIG. 3 is a diagrammatic top plan view of a steel bumper having strategically-placed accelerometers positioned thereon.

More particularly, and with reference to FIG. 3, a diagrammatic top plan view of the metal bumper 12 is illustrated. The bumper 12 includes a bumper beam 22 which is attached to two constrained rail support brackets 24 and 24'. The two constrained rail support brackets 24 and 24' fix the bumper 12 to the vehicle frame (not shown).

Placement of the Accelerometers

Because of the inherent stiffness of the metal bumper 12, the transmission of the impact to impact-sensing accelerometers is such that the impact signal sensed at the impact location is not necessarily the highest or strongest signal. Thus the impact situation involving the metal bumper 12 is quite unlike that arising in the case of the fascia of the typical car bumper that is formed from relatively soft polymerized materials, such as thermoplastic olefins, polycarbonates, polyesters, polypropylene, polyurethanes, polyamides, or blends of one or more of these with carbon or glass fibers. Where these softer materials form the bumper fascia, the impact point is also the location of the stronger accelerometer signal.

Conversely, in the case of the metal bumper 12, the strongest accelerometer signal is somewhat aligned with its fundamental oscillation mode. Hence, the strongest signals are often located at the midpoint 26 or free ends 28 and 28' of the bumper beam 22. When impacted by a single object, the metal bumper 12 oscillates in an orderly manner consistent with a beam supported at the two constrained rail support brackets 24 and 24' vibrating in its lowest fundamental mode. The midpoint 26 and the two free ends 28 and 28' generally oscillating with the larger amplitudes compared to the locations of the two constrained rail support brackets 24 and 24' which oscillate with generally the smallest amplitudes (nodes). This is particularly evident when the impacts occur at or near the midpoint 26 or the free ends 28 and 28'. This is least evident when the impacts occur at or near the two constrained rail support brackets 24 and 24' where higher oscillation modes are also likely to be strongly excited.

For these reasons, impacts with the same object moving at the same speed results in vastly different accelerometer signals depending on both the location of the impact and the location of the sensing accelerometer. Thus the strategic placement of accelerometers at proximate locations located inboard and/or outboard of each of the two constrained rail support brackets 24 and 24' represents the optimum points which provided the optimal compromise between desensitizing the accelerometer signal to impact location while permitting discrimination between impact severity, objects and/or impact speed.

Accordingly, the metal bumper 12 is fitted with a pair of strategically-placed accelerometers 30 and 30' positioned on the outboard side of the constrained rail support brackets 24 and 24'. It is advantageous to place these accelerometers as close as practical to the constrained rail support brackets within the constraints of the selected vehicle design and packaging without actually touching the support brackets. Additionally or alternatively the metal bumper 12 may also be fitted with a pair of strategically-placed accelerometers 32 and 32' positioned on the inboard side of the constrained rail support brackets 24 and 24'. Regardless of placement or number, the accelerometers 30, 30', 32, and 32' are connected to a central processing unit 34. Upon receiving a signal from one or more of the accelerometers 30, 30', 32, and 32' indicating an impact with a pedestrian, the central processing unit 34 signals the engine hood lift system and, where provided, the airbag deployment system (neither shown) to lift the engine hood 14 and to deploy the airbag 20.

Derivation of the Impact Signal

Figure 4:
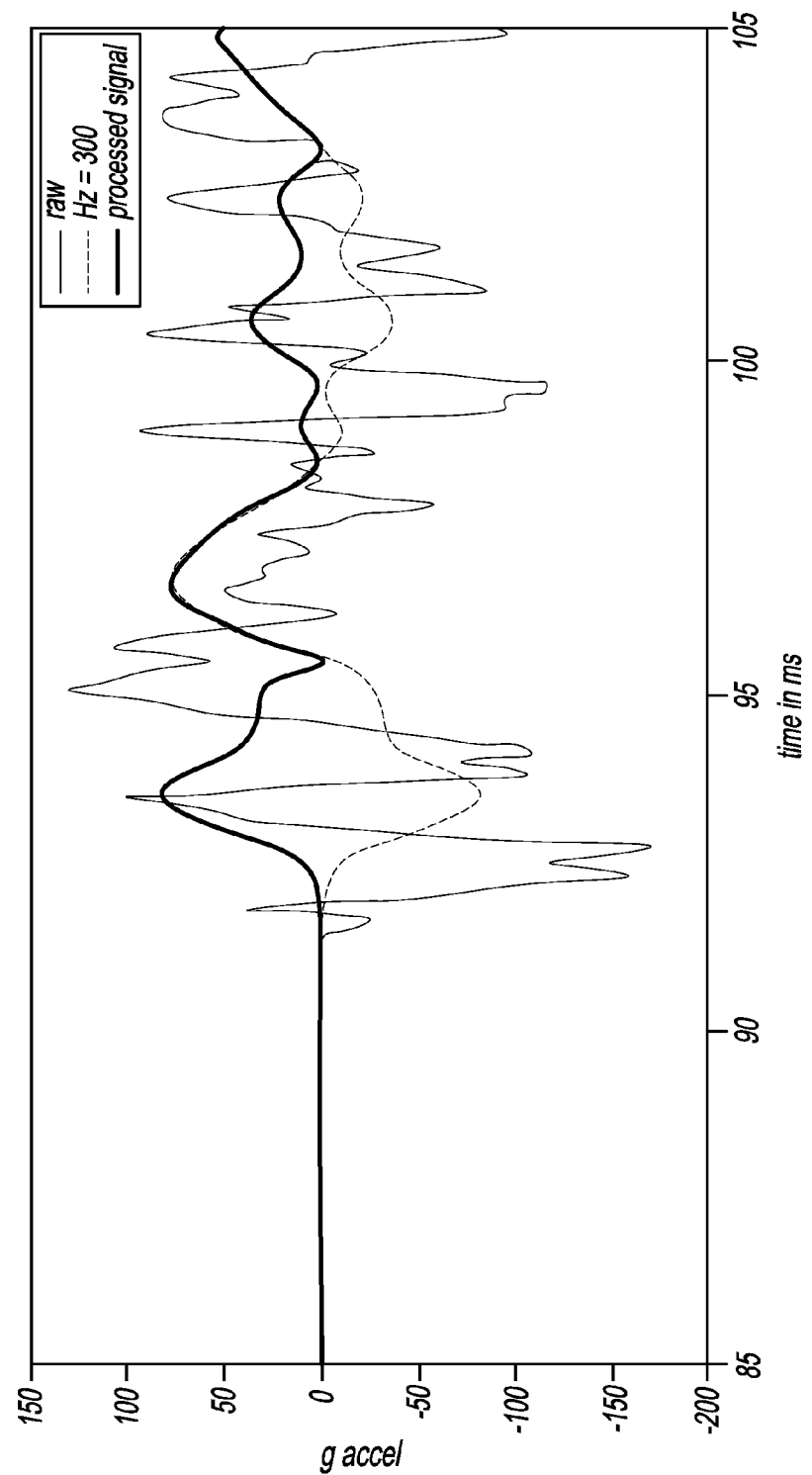
FIG. 4 is a graph illustrating accelerometer data processed by filtering and then taking an absolute value.

The signal from the accelerometers 30, 30', 32, and 32' located on the side of vehicle closest to the impact is larger than the signal from the other accelerometers 30, 30', 32, and 32' located on the opposite side. The two accelerometer signals (one located near the constrained bracket 24 and the other located near the constrained bracket 24') are combined into a single signal that is used to assess the impact, to discriminate between those impacts which most likely warrants deployment of some protection device(s) and those which do not. This combined signal, also known as an "impact signal," is formed by taking the larger of the two absolute values of filtered acceleration signals at each sample point from the two strategically placed accelerometers 30, 30', 32, and 32'. FIG. 4 illustrates an example of accelerometer data being processed by filtering followed by the taking of an absolute value. In this figure, the ordinate represents the acceleration measured in gravitational units (g accel) while the abscissa represents time (in ms) and the signals shown indicate a typical 40 kmph (kilometers per hour) impact with a pedestrian at the midpoint of the bumper of the vehicle with the signal also being measured by a sensor at the midpoint of the bumper location.

Figure 5:
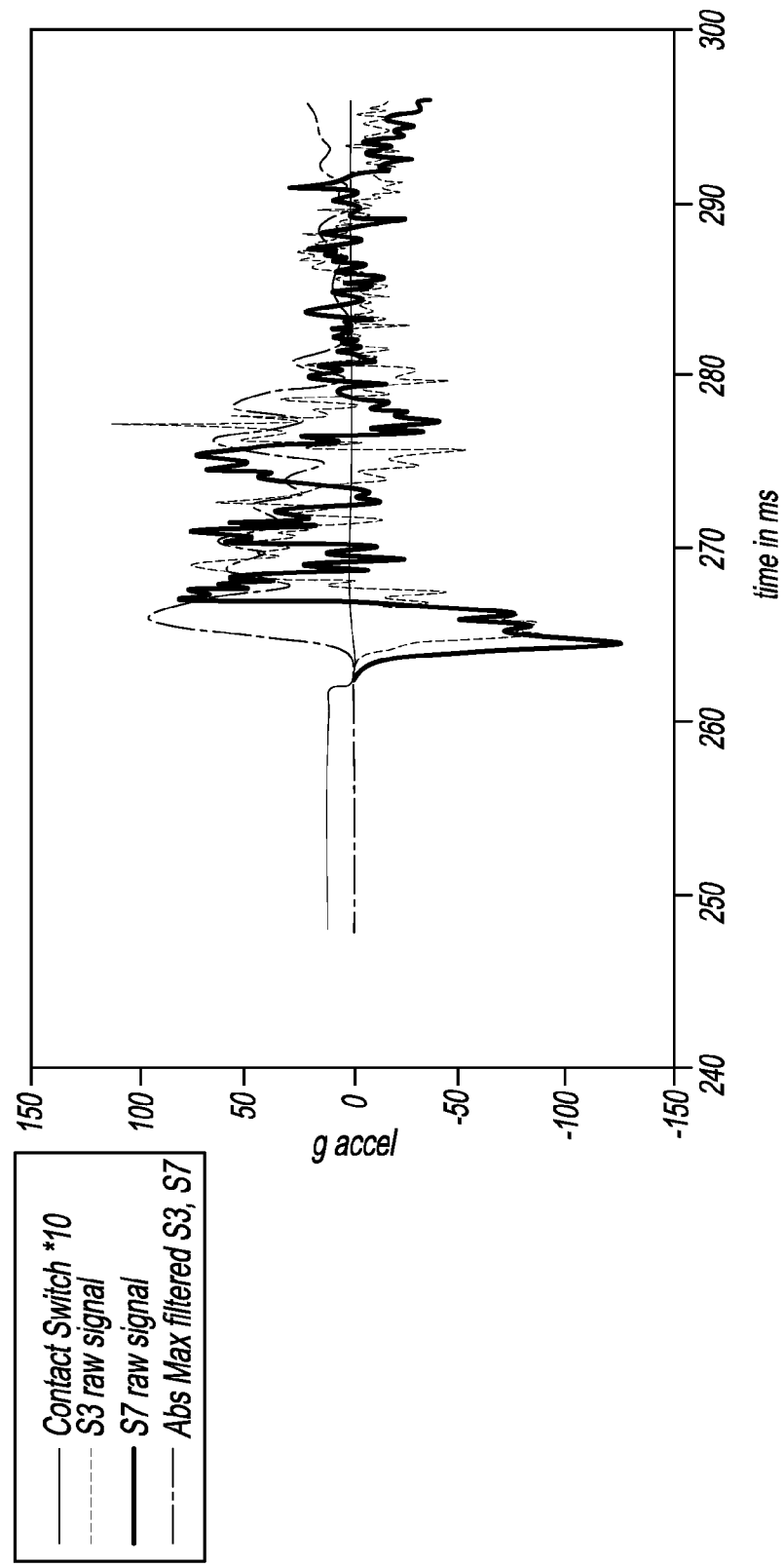
FIG. 5 is a graph illustrating accelerometer data.

FIG. 5 graphically illustrates an example of two pre-processed accelerometer data labeled as S3 and S7, one from left side of the metal bumper 12 and one from the right side of the metal bumper 12 which are filtered and combined by taking the larger of the two absolute values for each sample point. In this figure, the ordinate again represents the acceleration measured in gravitational units (g accel) while the abscissa again represents time (in ms). These data represent low pass filtered with the filter set at 400 hz. Typically, the cutoff is calibrated and additionally or alternatively tuned for either or both the specific vehicle and the specific bumper design.

Defining the Time Window

Figure 6:
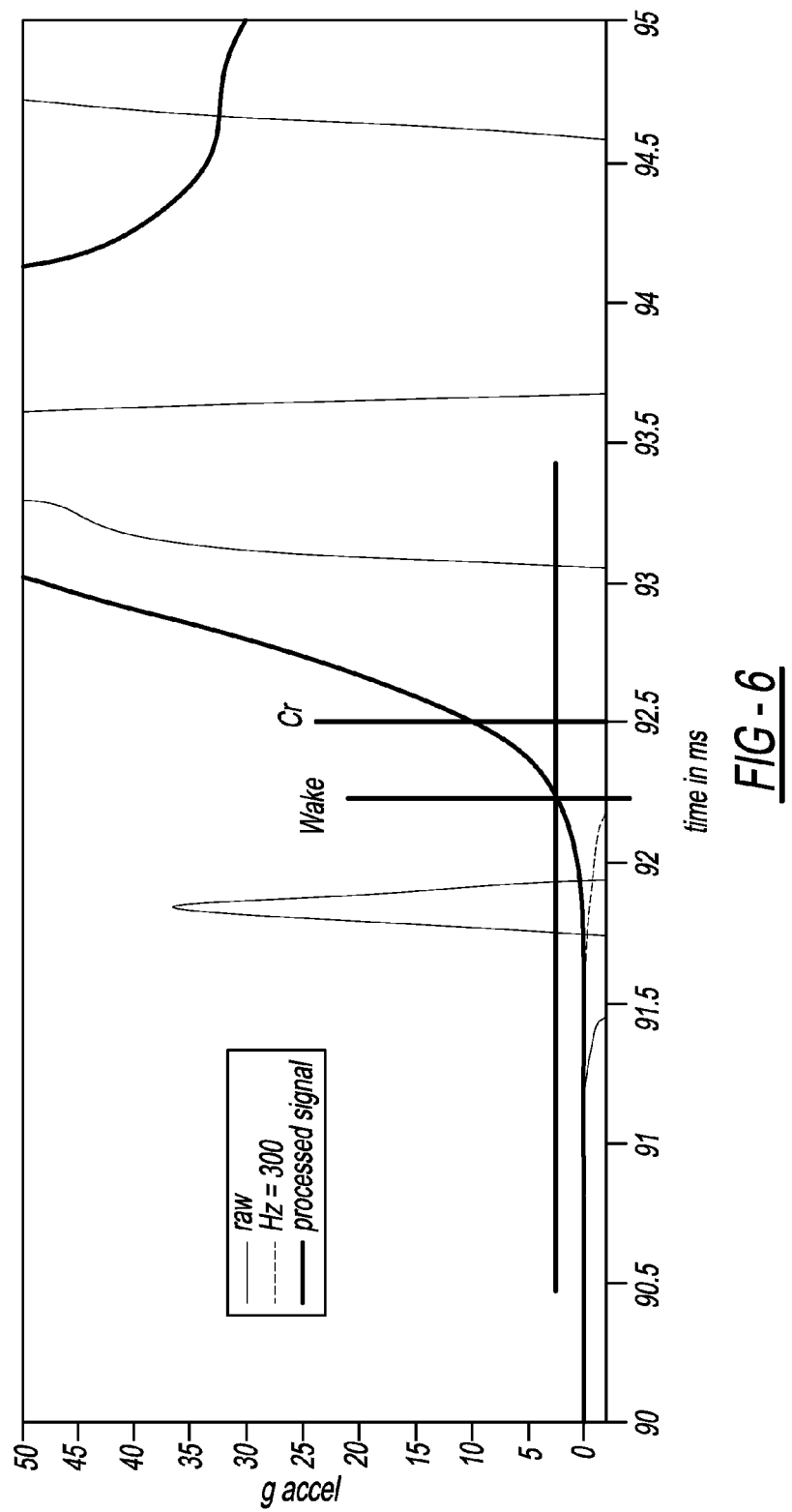
FIG. 6 is a graph illustrating the time window activation for the vehicle bumper sensor protective device system.

The time window begins at the time at "activation" and continues for the "window-active-duration" which is either or both calibrated and tuned for a specific vehicle-bumper-sensor-protective-device system. Activation occurs when a pre-determined number of consecutive samples from the "impact signal" exceed a pre-determined activation threshold. The pre-determined number of consecutive samples and the activation threshold are both calibrated and, or alternatively, tuned for specific system design that includes but is not limited to sensors, a sample rate, the vehicle design and, or alternatively, the bumper design and protective device(s). With adequate filtering and appropriately set threshold, a single sample alone may be sufficient for robust activation timing. An example of an activation threshold may be 2 g. FIG. 6 illustrates an example showing activation in which the ordinate represents the acceleration measured in gravitational units (g accel) while the abscissa represents time (in ms). FIG. 6 shows the processed signal crossing the activation threshold and the signal persisting for a preselected number of points before the activation time is shown at 92.5 ms.

Figure 7:
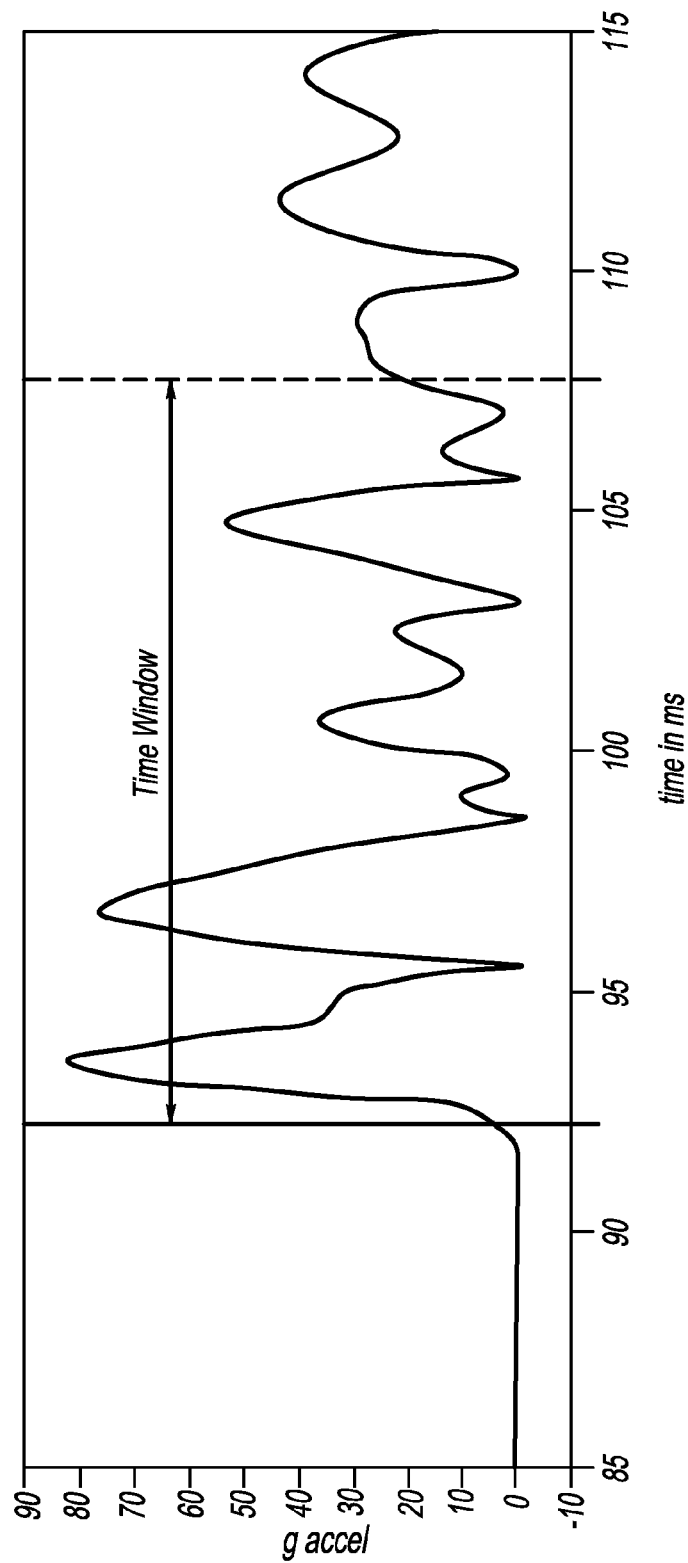
FIG. 7 is a graph illustrating the continuation of the time window of FIG. 6 but continuing for a period of window-active duration.

FIG. 7 illustrates an example showing a time window of 15 ms. Again, the ordinate represents the acceleration measured in gravitational units (g accel) while the abscissa represents time (in ms). As an example, in some cases, the processing signal alone may be used as a "deployment assessment signal" and a pedestrian protection device deployment decision may be made if the processed signal is consistently above the deployment threshold for the entire time window period.

Method for Deployment

The "impact signal" itself as defined above and, or alternatively, its first integration and, or alternatively, its $2^{nd}$ integration and, or alternatively, its further processing, for example, by additional filtering, up or down sampling or combinations results in one or more "deployment-assessment-signal(s)." Deployment occurs when a pre-determined number of consecutive samples from "deployment-assessment-signal" exceed a pre-determined deployment threshold within the defined "time window." If more than one deployment signal is derived and used, then some combination of the thresholds, signals and their threshold crossing(s) may be used. However, a single "time window" which is defined by the "impact signal" is applied to all the derived "deployment assessment signals" and their associated thresholds.

The pre-determined number of consecutive samples and the deployment threshold(s) are all calibrated and, or alternatively, tuned for specific system design that includes but is not limited to sensors, the sample rate, the vehicle design and, or alternatively, the bumper design and protective device(s). In the following example, a single deployment assessment signal which is identical to the impact signal itself is used.

Figure 8:
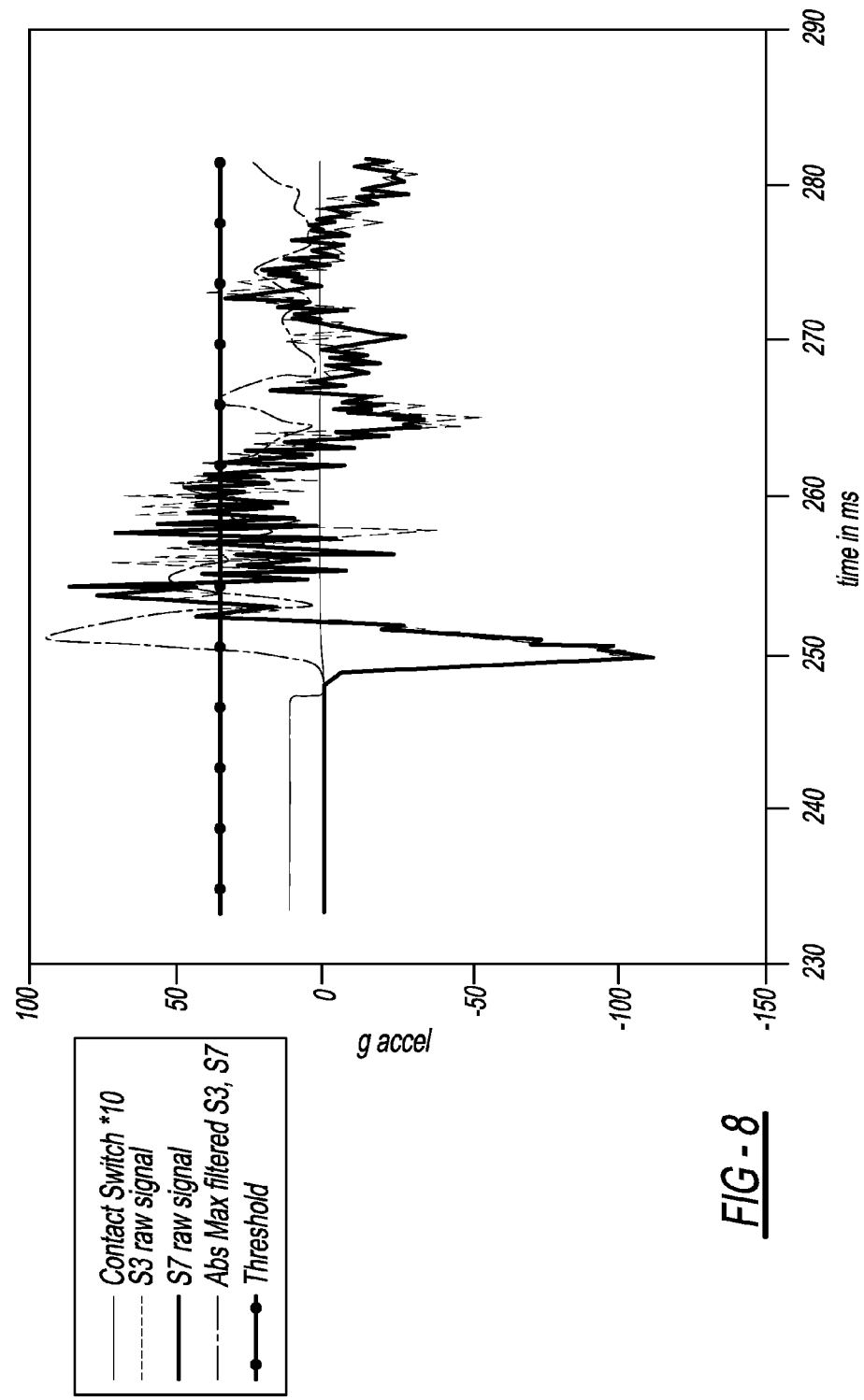
FIG. 8 is a graph illustrating a typical deployment event in which the deployment assessment signal crosses the threshold.

In FIG. 8, an example of a pedestrian impact situation involving a vehicle having a metal bumper for a deployment case with the deployment threshold set at 35 G acceleration and with a time window of 15 ms is shown. The graph shows a typical deployment case where the "deployment assessment signal" crosses the threshold around 250 ms.

Figure 9:
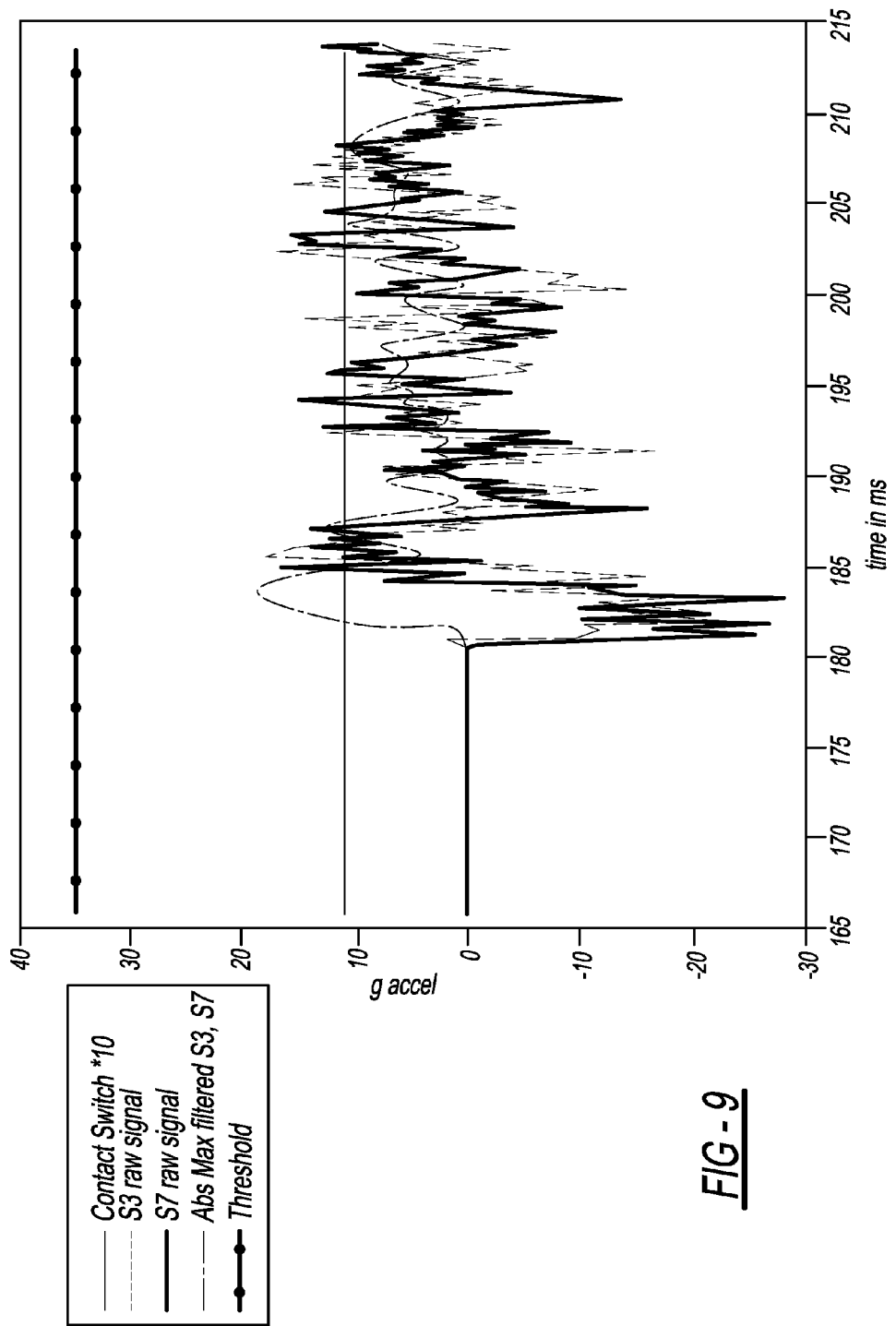
FIG. 9 is a graph illustrating a typical non-deployment event in which the deployment assessment signal is below the threshold.

A graph showing a typical non-deployment case where the "deployment assessment signal" is below the threshold set at 35 Gs is illustrated in FIG. 9. As with the other figures, in FIG. 9 the ordinate represents the acceleration measured in gravitational units (g accel) while the abscissa represents time (in ms).

It is to be noted that the data set forth in FIGS. 4 through 9 are intended as being exemplary only and not limiting.

The disclosed inventive concept as set forth above overcomes the challenges faced by bumper-associated pedestrian protection sensing systems for vehicles equipped with metal bumpers. However, one skilled in the art will readily recognize from such discussion, and from the accompanying drawings and claims, that various changes, modifications and variations can be made therein without departing from the true spirit and fair scope of the invention as defined by the following claims.

What is claimed is:

1. A method for sensing object impact for use with a vehicle comprising the steps of:

forming a vehicle having a metal bumper, first and second rail support brackets and a central processing unit, said bumper having a first end and a second end opposite said first end;

positioning a first accelerometer between said first bracket and said first end, a second accelerometer between said second bracket and said second end, positioning third and fourth accelerometers between said brackets, said third accelerometer being between said first bracket and said fourth accelerometer and said fourth accelerometer being between said second bracket and said third accelerometer;

generating signals from said accelerometers; and deriving a single impact signal from said signals.

2. The method for sensing object impact of claim 1 wherein said step of deriving and using a single impact signal from said first and second signal-generating accelerometers includes taking the larger of two absolute values derived from said accelerometers.

3. The method for sensing object impact of claim 1 wherein said first rail support bracket includes an inboard side and an outboard side and said second rail support bracket includes an inboard side and an outboard side and wherein said first accelerometer is fitted proximate said outboard side of said first rail support bracket and said second accelerometer is fitted proximate said outboard side of said second rail support bracket.

4. The method for sensing object impact of claim 1 wherein said first rail support bracket includes an inboard side and an outboard side and said second rail support bracket includes an inboard side and an outboard side and wherein said first accelerometer is fitted proximate said inboard side of said first rail support bracket and said second accelerometer is fitted proximate said inboard side of said second rail support bracket.

5. The method for sensing object impact of claim 1 further including a central processing unit to which said first and second accelerometers are attached and further including a pedestrian protection system selected from the group consisting of an engine hood lift system and an airbag deployment system, said central processing unit being attached to said pedestrian protection system.

6. A method for sensing object impact for use with a vehicle comprising the steps of:
forming a vehicle having a metal bumper, first and second rail support brackets and a central processing unit, said bumper having a long axis, said brackets having inboard sides and outboard sides;
positioning first and second signal-generating accelerometers proximate said outboard sides of said first and second support brackets respectively;
positioning third and fourth signal-generating accelerometers proximate said inboard sides of said first and second support brackets respectively, each of said accelerometers being positioned linearly along said axis; and
deriving and using a single impact signal from said signal-generating accelerometers by taking the larger of two absolute values derived from said accelerometers.

7. The method for sensing object impact of claim 6 wherein said first rail support bracket includes an inboard side and an outboard side and said second rail support bracket includes an inboard side and an outboard side and wherein said first accelerometer is fitted proximate said outboard side of said first rail support bracket and said second accelerometer is fitted proximate said outboard side of said second rail support bracket.

8. The method for sensing object impact of claim 6 wherein said first rail support bracket includes an inboard side and an outboard side and said second rail support bracket includes an inboard side and an outboard side and wherein said first accelerometer is fitted proximate said inboard side of said first rail support bracket and said second accelerometer is fitted proximate said inboard side of said second rail support bracket.

9. The method for sensing object impact of claim 6 further including connecting said first accelerometer, said second accelerometer, said third accelerometer and said fourth accelerometer to said central processing unit.

\* \* \* \* \*